April 8, 1958     F. B. JACOB     2,830,167
OPERATING MECHANISM FOR A RESISTANCE WELDER CONTROL
Filed Feb. 27, 1957     2 Sheets-Sheet 1
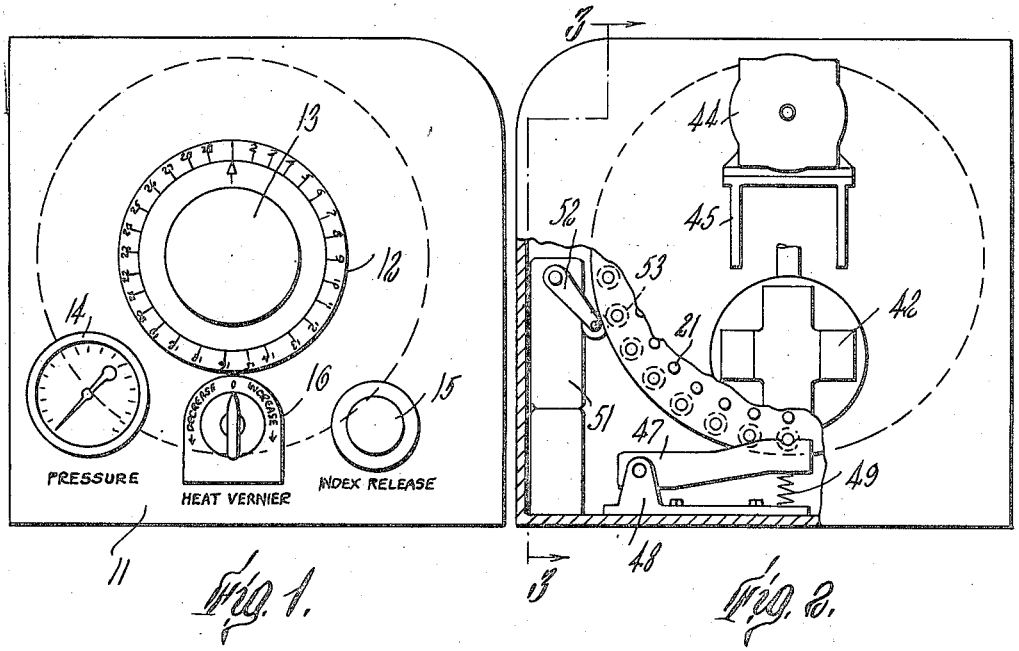
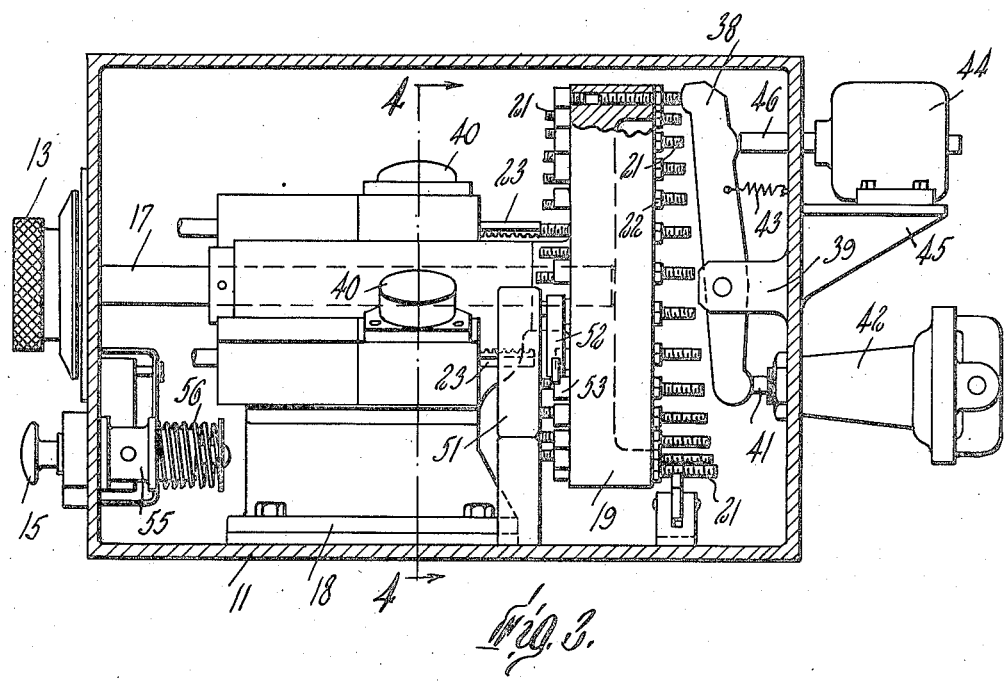

April 8, 1958 F. B. JACOB 2,830,167
OPERATING MECHANISM FOR A RESISTANCE WELDER CONTROL
Filed Feb. 27, 1957 2 Sheets-Sheet 2

United States Patent Office 2,830,167
Patented Apr. 8, 1958

2,830,167

OPERATING MECHANISM FOR A RESISTANCE WELDER CONTROL

Fraser B. Jacob, Lynn, Mass., assignor to Thomson Electric Welder Company, Lynn, Mass., a corporation of Massachusetts Application February 27, 1957, Serial No. 642,693

12 Claims. (Cl. 219—78)

This invention relates to an operating mechanism for a resistance welder control.

As is well known to those skilled in the art, most general purpose welder controls that are available commercially have a number of control elements whereby a corresponding number of welding process variables may be individually adjusted. These variables included welding force, weld time, hold time, and heat, each of which must be assigned a particular value determined by the type of work involved in the process. Since materials and thicknesses of work that may be encountered vary widely, a relatively skilled operator having a knowledge of many different combinations of control element settings is required to operate a conventional welder control.

It is an object of the present invention to provide a mechanism having a single control knob, which is capable of producing simultaneously, with a single setting, any combination of adjustments that will ordinarily be required in a welder control, thereby permitting change overs from one type of work to another to be made more simply and quickly with less chance for human error.

The novel features of the invention together with further objects and advantages thereof will become apparent from the preferred embodiment of the invention illustrated in the drawings and described in detail hereinafter.

In the drawings:

Fig. 1 is a front view of the mechanism in accordance with the present invention illustrating the arrangement of the control panel;

Fig. 2 is a rear view of the mechanism in accordance with the present invention with portions cut away to show certain of its operating parts more clearly;

Fig. 3 is a sectional view taken of line 3—3 of Fig. 2;

Figure 4:
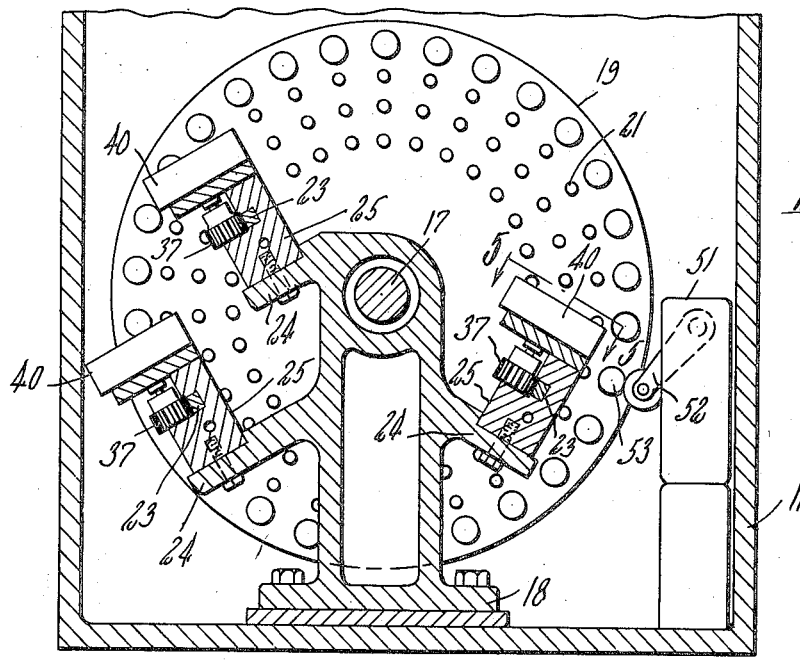
Fig. 4 is a sectional view taken of line 4—4 of Fig. 3.

As best shown in Fig. 1, the control panel 11 for the mechanism of the present invention is provided with a circular scale 12 having numerical graduations which designate thirty different incremental angular positions to which a main control knob 13 may be selectively moved. In the lower left hand corner of the panel 11 there is mounted a gage 14 to indicate air pressure, and in the lower right hand corner there is an index release knob 15 which, upon actuation, effectively resets the mechanism and permits the main control knob 13 to be rotated into a new angular position. There is also provided between the pressure gage 14 and the index release knob 15 a heat vernier control knob 16 for one of the welding temperature control elements of a conventional welder control with which the mechanism of the present invention is to be associated.

The manner in which the main control knob 13 and the index release knob 15 are adapted to initiate simultaneous adjustments in a welder control may be readily understood with reference to Figs. 2, 3, and 4. As shown in Figs. 3 and 4, the main control knob 13 is provided with a shaft 17 which is journaled in an up-right member 18 bolted to the frame of the mechanism. Attached to the end of the shaft opposite the knob 13 is a programming disc 19 provided with a plurality of indexing elements or pins 21. The pins 21 are constituted by studs arranged in rings which project, coaxially of the disc, there being three rings of tapped holes on the front side of the disc and one ring of tapped holes on the rear side to receive the studs. The number and angular spacing of the studs in each ring correspond to the graduations of the scale 12. Thus each ring has 30 studs spaced at uniform intervals but which project from the disc for different predetermined distances. These distances may be adjusted according to the extent to which the studs are screwed into the disc, and once established, the studs are locked in position by nuts 22.

Figure 5:
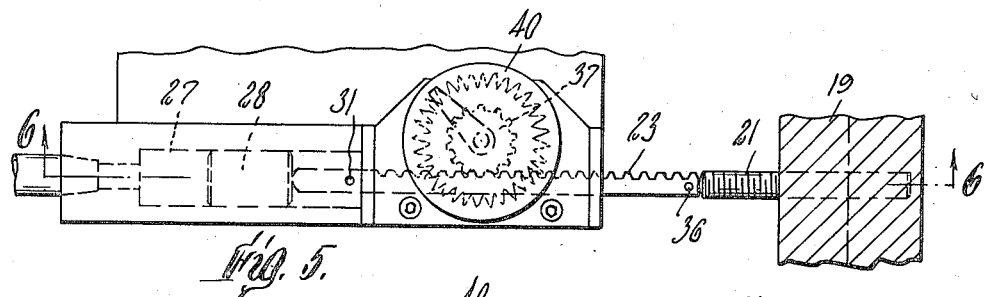
Fig. 5 is a sectional view taken of line 4—4 of Fig. 4.

Co-operating with the individual studs in each ring on the front side of the disc are rack members 23 adapted for linear travel into and out of positions of registry with the studs. To this end, up-right 18 is provided with three projecting arms 24 (Fig. 4) to which are attached guide blocks 25 for the racks 23. As shown in detail in Figs. 5 and 6, each guide block 25 has in addition to a rack guide way designated 26, a cylinder-like bore 27 wherein a piston 28 is provided in axial alignment with the guide way. The end of the bore remote from the guide way is adapted to receive a coupling for an air line (not shown), and there is an exhaust port 31 extending from a point near the end of the bore adjacent the guide way to the outside of the block.

Figure 6:
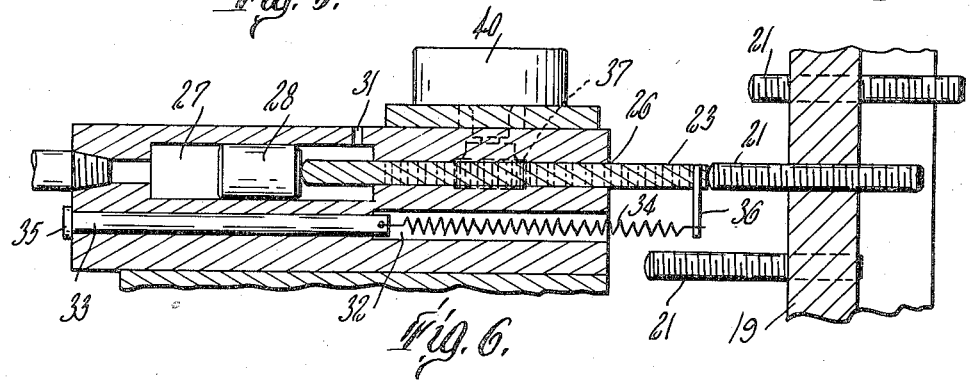
Fig. 6 is a sectional view taken of line 6—6 of Fig. 5.

Beneath the bore 27 and the guide way 26, as they are oriented in Fig. 6, there is provided another bore 32 for a rod 33 and a tension spring 34. One end of the rod 33 is threaded for a short distance and a nut 35 thereon controls the extent to which the rod projects into the bore 32. The tension spring 34 is connected between the opposite end of the rod 33 and a cross pin 36 which is rigidly joined to the rack 23. As will be brought out more clearly in connection with the description of the operation of the mechanism, springs 34 serve to bias the racks 23 away from their corresponding rings of studs 21, and pistons 28 serve to overcome the bias and to urge the racks into positions of registry with individual ones of the studs determined by the angular position of the disc. In turn, each rack is adapted to mesh with a gear 37 rigidly mounted on the operating shaft of a corresponding control element or potentiometer 40 of the welder control with which the mechanism is to be associated.

The single ring of studs projecting from the rearward side of the disc 19 is adapted to index a pivotal lever 38 in a way which in principle is similar to the way in which the racks 23 are indexed by the studs on the opposite side of the disc. This is best shown on Fig. 3, where it will be observed lever 38 is pivotally attached to an arm 39, which in turn is affixed to the frame of the mechanism. The end of the lever which is adapted to register with the studs 21, or more particularly a particular stud determined by the angular position of the disc 19, has a hammer-like contour, and the other end of the lever is contoured to register with the movable element 41 of a pneumatic valve 42. Valve 42, like potentiometers 40 is a conventional welder control element and serves to control the welding force to be applied to the welding electrodes. A tension spring 43 connected between the lever 38 and the frame biases the lever away from the studs but this bias is subject to being overcome as in the case of the racks 23. A conventional air cylinder 44 is utilized for this purpose, the latter being mounted on a shelf 45 at the rear of the frame, and having its piston 46 in registry with a raised portion on the lever 38.

The rearward ring of studs is also utilized to obtain positive indexing of the disc 19 in any one of the thirty angular positions defined by the scale 12. For this purpose there is provided a detent arm 47 (Fig. 2) which at one end is pivotally attached to fixed member 48 and at its other end is urged toward the studs by a compression spring 49. As is apparent from Fig. 2, the notch in the detent arm will register with one of the studs, only when the main control knob 13 and hence the disc 19 is properly positioned angularly. Also in Fig. 2 it will be observed there is a switch 51 mounted so that its roller contact arm 52 will be acted upon by a ring of pins 53 concentric about the outermost ring of studs on the forward side of the disc. Whereas detent arm 47 provides positive mechanical indexing of the disc 19 in order to insure that proper registry is obtained between the pivotal member 38 and racks 23 on the one hand and the studs 21 on the other, switch 51 is provided for the purpose of disabling the welder in the event the disc is improperly indexed. If such a condition should arise, the roller on the switch arm 52 will be out of contact with one of the pins 53 and hence the condition of the switch contacts (not shown) will become reversed. Various ways of disabling a welder control in response to either an opening or closing of a pair of switch contacts are well known to those skilled in the art and therefore not a concern of the present invention.

To operate the mechanism of the present invention, the index release knob 15 is pulled out so as to close an air valve 55 coupled to the pneumatic cylinders 27 and 44. Since welding machines most commonly have pneumatically operated electrodes, the same source of air under pressure which is used for the machine may also be coupled to the valve 55. With the index release knob 15 in its outward position and the air to the cylinders cut off, lever 38 and racks 23 are caused to move away from the studs 21 under the influence of springs 43 and 34, respectively. At this time, the main control knob 13 may be rotated into the particular angular position which is best suited for the work at hand. That is to say, if the index release knob 15 now be permitted to resume its normal position to which it is urged by a compression spring 56, the pistons 46 and 28 will be caused to move under the influence of air under pressure admitted to the cylinders 44 and 27 by the valve 55. These pistons in turn will push the lever 38 and the racks 23 into positions of registry with individual studs in each ring, thereby establishing predetermined angular positions for the gears 37 and the lever 38. As is apparent, the former govern the settings of the potentiometers 40 and the latter the setting of the welding force control valve 42.

By appropriate choice of the relative lengths of the studs 21 at each angular position of registry associated with the disc, it has been found that thirty alternate angular positions of the main control knob provide alternate combinations of adjustments of the welder control elements which will adapt a welding machine to operations on over one hundred different combinations of materials and thicknesses. If a still more selective mode of control is required for out of the ordinary types of work, the number of studs in each ring and the graduations for the main control knob may, of course, be increased correspondingly. Also, the mechanism of the present invention may be adapted to operate on a greater number of control elements by the provision of additional rings of studs and an additional movable element to be indexed thereby. Various modifications of this nature that are within the spirit and scope of the invention will no doubt occur to those skilled in the art, and therefore the invention should not be deemed to be limited to the preferred embodiment described herein by way of example but should be deemed to be limited only by the scope of the appended claims.

What is claimed is:

1. An operating mechanism for a resistance welder control, said mechanism comprising a programming member adapted to be manually moved into any one of a fixed number of incremental positions in space, a plurality of indexing elements of various predetermined lengths rigidly mounted on said programming member, said elements being arranged in groups and the elements in each group being spaced at intervals corresponding to said incremental positions of said programming member, movable members adapted to register with individual indexing elements in said groups when said programming member is in one of said incremental positions, means to bias said movable members away from said indexing elements to permit said programming member to be moved into a selected one of said incremental positions, means selectively to overcome said bias and to urge said movable members into positions of registry with the individual indexing elements corresponding to said selected position to which said programming member is moved, and means to produce simultaneous adjustments in said welder control as a function of said positions of registry of said movable members as determined by the respective lengths of said individual indexing elements.

2. An operating mechanism for a resistance welder control, said mechanism comprising a programming member adapted to be manually rotated into any one of a fixed number of incremental angular positions, a plurality of indexing elements of various predetermined lengths rigidly mounted on said programming member, said elements being arranged in rings projecting coaxially of said programming member and being angularly spaced at intervals corresponding to said incremental angular positions, movable members adapted to register with individual indexing elements in said rings when said programming member is in one of said incremental angular positions, means to bias said movable members away from said indexing elements to permit said programming member to be rotated into a selected one of said incremental angular positions, means selectively to overcome said bias and to urge said movable members into positions of registry with the individual indexing elements corresponding to said selected angular position, and means to produce simultaneous adjustments in said welder control as a function of said positions of registry of said movable members as determined by the respective lengths of said individual indexing elements.

3. An operating mechanism for a resistance welder control, said mechanism comprising a programming member adapted to be manually rotated into any one of a fixed number of incremental angular positions, a plurality of indexing elements of various predetermined lengths rigidly mounted on said programming member, said elements being arranged in rings projecting coaxially of said programming member and being angularly spaced at intervals corresponding to said incremental angular positions, rack members mounted for limited linear travel to positions of registry with individual indexing elements in said rings when said programming member is in one of said incremental angular positions, means to bias said rack members away from said indexing elements to permit said programming member to be rotated into a selected one of said incremental angular positions, means selectively to overcome said bias and to urge said rack members into positions of registry with the individual indexing elements corresponding to said selected angular position, and gears in mesh with the respective rack members to produce simultaneous adjustments in said welder control as a function of said positions of registry of said movable members as determined by the respective lengths of said individual indexing elements.

4. A mechanism according to claim 3 including at least one pivotal member mounted for limited arcuate travel to a position of registry with an individual indexing element in one of said rings when said programming member is in one of said incremental angular positions, means to bias said pivotal member away from said indexing elements to permit said programming member to be rotated into a selected one of said incremental angular positions, means selectively to overcome said bias and to urge said pivotal member into a position of registry with the individual indexing element corresponding to said selected angular position, and means to produce an adjustment in said welder control as a function of the angular position of said pivotal member as determined by the length of said individual indexing element.

5. An operating mechanism for a resistance welder control, said mechanism comprising a programming disc adapted to be manually rotated into any one of a fixed number of incremental angular positions, a plurality of pin-like elements of various predetermined lengths rigidly mounted on said programming disc, said elements being arranged in rings projecting coaxially of said programming disc and being angularly spaced at intervals corresponding to said incremental angular positions, movable members adapted to register with individual pin-like elements in said rings when said programming disc is in one of said incremental angular positions, means to bias said movable members away from said pin-like elements to permit said programming disc to be rotated into a selected one of said incremental angular positions, means selectively to overcome said bias and to urge said movable members into positions of registry with the individual pin-like elements corresponding to said selected angular position, and means to produce simultaneous adjustments in said welder control as a function of said positions of registry of said movable members as determined by the respective lengths of said individual pin-like elements.

6. An operating mechanism for a resistance welder control, said mechanism comprising a programming disc adapted to be manually rotated into any one of a fixed number of incremental angular positions, a plurality of pin-like elements of various predetermined lengths rigidly mounted on said programming disc, said elements being arranged in rings projecting coaxially of said programming disc and being angularly spaced at intervals corresponding to said incremental angular positions, movable members adapted to register with individual pin-like elements in said rings when said programming disc is in one of said incremental angular positions, springs to bias said movable members away from said pin-like elements to permit said programming disc to be rotated into a selected one of said incremental angular positions, pneumatically actuated pistons adapted to overcome the bias of said springs and to urge said movable members into positions of registry with the individual pin-like elements corresponding to said selected angular position, valve means selectively to actuate said pistons, and means to produce simultaneous adjustments in said welder control as a function of said positions of registry of said movable members as determined by the respective lengths of said individual pin-like elements.

7. An operating mechanism for a resistance welder control, said mechanism comprising a programming disc adapted to be manually rotated into any one of a fixed number of incremental angular positions, a plurality of pin-like elements of various predetermined lengths rigidly mounted on said programming disc, said elements being arranged in rings projecting coaxially of said programming disc and being angularly spaced at intervals corresponding to said incremental angular positions, rack members mounted for limited linear travel to positions of registry with individual pin-like elements in said rings when said programming disc is in one of said incremental angular positions, means to bias said rack members away from said pin-like elements to permit said programming disc to be rotated into a selected one of said incremental angular positions, means selectively to overcome said bias and to urge said rack members into positions of registry with the individual pin-like elements corresponding to said selected angular position, and gears in mesh with the respective rack members to produce simultaneous adjustments in said welder control as a function of said positions of registry of said movable members as determined by the respective lengths of said individual pin-like elements.

8. An operating mechanism for a resistance welder control, said mechanism comprising a programming disc adapted to be manually rotated into any one of a fixed number of incremental angular positions, a plurality of pin-like elements of various predetermined lengths rigidly mounted on said programming disc, said elements being arranged in rings projecting coaxially of said programming disc and being angularly spaced at intervals corresponding to said incremental angular positions, rack members mounted for limited linear travel to positions of registry with individual indexing elements in said rings when said programming disc is in one of said incremental angular positions, springs to bias said rack members away from said pin-like elements to permit said programming disc to be rotated into a selected one of said incremental angular positions, pneumatically actuated pistons adapted to overcome the bias of said springs and to urge said rack members into positions of registry with the individual pin-like elements corresponding to said selected angular position, valve means selectively to actuate said pistons, and gears in mesh with the respective rack members to produce simultaneous adjustments in said welder control as a function of said positions of registry of said rack members as determined by the respective lengths of said individual pin-like elements.

9. A mechanism according to claim 8 including at least one pivotal member mounted for limited arcuate travel to a position of registry with an individual pin-like element in one of said rings when said programming disc is in one of said incremental angular positions, a spring to bias said pivotal member away from said pin-like elements to permit said programming disc to be rotated into a selected one of said incremental angular positions, means selectively to overcome said bias and to urge said pivotal member into a position of registry with the individual pin-like element corresponding to said selected angular position, and means to produce an adjustment in said welder control as a function of the angular position of said pivotal member as determined by the length of said individual pin-like element.

10. A mechanism according to claim 9 wherein said means to urge said pivotal member into a position of registry is constituted by a pneumatic cylinder under the control of said valve means.

11. An operating mechanism for a resistance welder control, said mechanism comprising a main control shaft, a mounting for said shaft permitting manual rotation thereof, a programming disc axially fixed to said shaft, detent elements affixed to said disc at predetermined angular positions, a detent arm adapted to engage said detent elements when said disc is manually rotated into one of said angular positions, a plurality of pin-like elements of various predetermined lengths rigidly mounted on said programming disc, said elements being arranged in rings projecting coaxially of said disc and being angularly spaced at intervals corresponding to said predetermined angular positions, rack members, fixed guide blocks provided with guide ways for said rack members, respectively, constraining the latter to move linearly to and from positions of registry with individual indexing elements in said rings, springs operatively coupled between said guide blocks and said rack members, respectively, to bias said rack members away from said pin-like elements and to permit said disc to be rotated into a selected one of said predetermined angular positions, pistons disposed in bores in said guide blocks coextensive with said guide ways, respectively, a valve to admit air under pressure to said bores to cause said pistons to move said rack members into positions of registry with the individual pin-like elements corresponding to said selected angular position, and gears in mesh with said rack members, respectively, to produce simultaneous adjustments in said welder control as a function of said positions of registry of said rack members as determined by the respective lengths of said individual pin-like elements.

12. A mechanism according to claim 11 including at least one pivotal member mounted for limited arcuate travel to a position of registry with an individual pin-like element in one of said rings when said programming disc is in one of said incremental angular positions, a spring to bias said pivotal member away from said pin-like elements to permit said programming disc to be rotated into a selected one of said incremental angular positions, means selectively to overcome said bias and to urge said pivotal member into a position of registry with the individual pin-like element corresponding to said selected angular position, and means to produce an adjustment in said welder control as a function of the angular position of said pivotal member as determined by the length of said individual pin-like element.

References Cited in the file of this patent

UNITED STATES PATENTS

| | | |
|---|---|---|
| 1,931,255 | Frantz | Oct. 17, 1933 |
| 2,173,368 | Martin | Sept. 19, 1939 |